United States Patent
Schmidt et al.

(10) Patent No.: US 11,402,042 B2
(45) Date of Patent: Aug. 2, 2022

(54) TORSIONALLY FLEXIBLE ATTACHMENT SYSTEM AND METHOD

(71) Applicant: UCHICAGO ARGONNE, LLC, Chicago, IL (US)

(72) Inventors: Oliver A. Schmidt, Lombard, IL (US); Jonathan J. Knopp, Naperville, IL (US); Christa A. Benson, Naperville, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 516 days.

(21) Appl. No.: 16/286,193

(22) Filed: Feb. 26, 2019

(65) Prior Publication Data

US 2020/0271257 A1   Aug. 27, 2020

(51) Int. Cl.
*F16L 27/107* (2006.01)
*F16L 27/10* (2006.01)

(52) U.S. Cl.
CPC ......... *F16L 27/107* (2013.01); *F16L 27/1012* (2013.01)

(58) Field of Classification Search
CPC ... F16L 27/107; F16L 27/1012; F16L 27/108; F16L 27/113; F16L 27/11; F16L 51/02; F16L 51/022; F16L 51/023; F16L 51/024; F16L 51/025; F16L 51/028; F16L 51/03
USPC .......................................... 285/114, 224, 235
See application file for complete search history.

(56) References Cited

U.S. PATENT DOCUMENTS

| 3,082,795 A * | 3/1963 | Heller .................... F16L 27/111 |
| | | 285/114 |
| 5,050,894 A * | 9/1991 | Merel |
| 5,956,950 A * | 9/1999 | Gensert |
| 5,992,900 A * | 11/1999 | Heller .................... F16L 27/11 |
| | | 285/114 |
| 6,852,035 B2 | 2/2005 | Tsugane et al. |
| 8,181,672 B2 | 5/2012 | Weiss et al. |
| 2019/0128453 A1 * | 5/2019 | Clark ...................... F16L 27/11 |

OTHER PUBLICATIONS

Yusuke Suetsugu, et al., "Development of an all-metal vacuum bellows following twist motion," Journal of Vacuum Science and Technology A 17, Nov./Dec. 1999, AVS Science & Technology of Materials, Interfaces, and Processing, pp. 3500-3504.

* cited by examiner

*Primary Examiner* — Zachary T Dragicevich
(74) *Attorney, Agent, or Firm* — Cherskov Flaynik & Gurda, LLC

(57) ABSTRACT

A flexible attachment assembly is described having a bellows capable of absorbing torsion having a first end; a second end opposite to the first end; and a plurality of tubes, each of which is hollow and wound around a longitudinal axis while extending from the first end to the second end, where the plurality of tubes are communicated with each other all along the longitudinal length of the bellows so as to form a bore between the first end and the second end. Also provided is a bellows assembly having at least two sections, each section having a plurality of tubes, each of which is hollow and wound around a longitudinal axis and thus form a bore, where the plurality of sections are connected with each other so that their bores are communicated.

9 Claims, 7 Drawing Sheets

US 11,402,042 B2

TORSIONALLY FLEXIBLE ATTACHMENT SYSTEM AND METHOD

CONTRACTUAL ORIGIN OF THE INVENTION

This invention was made with government support under Contract No. DE-AC02-06CH11357 awarded by the United States Department of Energy to UChicago Argonne, LLC, operator of Argonne National Laboratory. The government has certain rights in the invention.

BACKGROUND OF THE INVENTION

1. Field of the Invention

The present invention relates in general to an attachment system and method, and more specifically, the present invention relates to a system and method for applying torque to an elongated substrate while still maintaining a seal at either end of the substrate.

2. Background of the Invention

In vacuum systems, flexible couplings or bellows are often used to allow for spatial offset; this to accommodate both static alignment and dynamic motion of components. Typical bellows have been widely applied for many vacuum systems in different fields such as surface analyzing systems, semiconductor process systems, nuclear fusion systems, accelerators, optical systems, and so on.

Corrugations of conventional vacuum bellows are normal to the center axis. These corrugations accommodate the off-axis motion, bending motion, and contraction/expansion commensurate with attachment to a rigid fixture. However these corrugations also make it difficult to absorb angular motion around the bellow's central axis while establishing a vacuum tight seal.

Especially for High-Vacuum (HV) and Ultra High Vacuum (UHV) systems where the pressure can be as low as 100 nPa or even lower, connectors need to be constructed of a solid impermeable material such as stainless steel either formed or edge welded. Such connectors are however very stiff in torsion and do not allow for rotation about the axis. This has always been an issue in precision alignment of optical components. In addition, materials that are incompatible with UHV systems, such as semi rigid and flexible materials (e.g. rubber) will not provide an adequate, reproducible vacuum seal. Such materials also may contaminate the system.

There have been attempts to accommodate angular motion in vacuum line attachment scenarios. However, these attempts rely on positioning mechanical motions inside the vacuum system. This can be very expensive and not always effective.

Solutions also exist to allow for angular movement about the longitudinal axis of a vacuum line coupler wherein the coupling mechanism comprises a corrugation section oblique to the longitudinal axis. These are complicated multipart systems requiring difficult manufacturing processes. The nonhomogeneous construction of these systems do not confer rotation about their longitudinal axis.

State of the art homogeneously constructed couplers also do not confer reversible deformation around their longitudinal axis. Rather, a pseudo-rotation occurs whereby obliquely arranged (relative to the longitudinal axis) bellows positioned between the ends of the couplers buckle (often irreversibly) in a controlled manner. Bellows sections flanking the oblique bellows (i.e., so as to be positioned at either end of the construct) are provided to compensate for this deformation and twisting. While this may maintain leak proof seals, irreversible buckling of the construct may occur.

Generally, state of the art heterogeneously constructed and homogeneously constructed bellows requires a longer overall length to achieve rotations about the longitudinal axis. Aside from absorbing the twisting motions, bending and shifting motions also need to be accommodated.

A need exists in the art for an elongated substrate resistant to deformation at its ends when subjected to angular force (e.g. twisting). The substrate should be rigid in construction, generally homogenous in construction, and not incorporate rubber or other flexible materials. The substrate should also provide an unobstructed passage along the axis for application to various lines, tubes, and other devices or media even in instances of maximum torque wherein the substrate is twisted more than 90 degrees. The substrate should be reversibly deformable in either direction of application of angular force.

SUMMARY OF INVENTION

An object of the invention is to provide an elongated substrate as a physical connector or a fluid conduit that overcomes many drawbacks of the prior art.

Another object of the invention is to provide a method and a system for facilitating thermal, fluid, or electrical transfer between rigid bodies. A feature of the invention is the incorporation of reversibly deformable characteristics to rigid materials. An advantage of the invention is that despite the imposition of angular forces, the invention maintains hermetic seals with each of said rigid bodies.

Yet another object of the present invention is to provide an elongated substrate defining a central region to facilitate fluid or electric transfer between a first end of the substrate and a second end of the substrate. A feature of the invention is a plurality of helical shoulders circumscribing the central region in an unbroken and continuous extension from one end of the substrate to the other end. An advantage of the invention is that the shoulders provide a means for allowing the substrate to reversibly deform in response to the application of angular bias. Another advantage of the invention is that a plurality of substrates may be fastened to each other end to end, resulting in an increase in torsional deformation to the plurality.

Still another object of the present invention is to provide a vacuum coupling device. A feature of the invention is a central shaft in fluid communication with a plurality of longitudinally extending helical cavities circumscribing the shaft. An advantage of the invention is that the helical cavities provide a means for the coupling device to maintain a hermetic seal on each of its ends despite the application of angular force (e.g., twisting) that may occur while attaching or removing the device from vacuum equipment.

Briefly, the invention provides an attachment assembly capable of absorbing torsion, comprising: an elongated substrate comprising a first end and a second end opposite to the first end, comprising a plurality of shoulders, each of which is hollow and has a void space, wherein the plurality of shoulders are wound around a center axis of the elongated substrate in a helical fashion, and the respective void spaces of the shoulders are in fluid communication with each other along the entire longitudinal length of the elongated substrate so as to form a cavity extending from the first end to the second end of the substrate. Specifically, the invention provides an elongated substrate having a first end and a second end and defining a center longitudinally extending region; a plurality of shoulders wound about the region; and a void space defined by each of said shoulders, said void space in fluid communication with the center longitudinally extending region.

Also provided is a method for aligning a coupling between a first component and a second component, the method comprising supplying an elongated substrate having a first end, a second end, a longitudinally extending region between the first and second end, and a tunnel extending from the first end to the second end, wherein the tunnel has a first cross section; rigidly attaching the first end to the first component until a seal is formed between the first end and the one component; rigidly attaching the second end to the second component until a second seal is formed between the second and the second static component; and reversibly rotating or twisting the longitudinally extending region along its roll axis by twisting or rotating the first end relative to the second end.

BRIEF DESCRIPTION OF DRAWING

The invention together with the above and other objects and advantages will be best understood from the following detailed description of the preferred embodiment of the invention shown in the accompanying drawings, wherein.

DETAILED DESCRIPTION OF THE INVENTION

The foregoing summary, as well as the following detailed description of certain embodiments of the present invention, will be better understood when read in conjunction with the appended drawings.

All numeric values are herein assumed to be modified by the term "about", whether or not explicitly indicated. The term "about" generally refers to a range of numbers that one of skill in the art would consider equivalent to the recited value (e.g., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

The following detailed description should be read with reference to the drawings in which similar elements in different drawings are numbered the same. The drawings, which are not necessarily to scale, depict illustrative embodiments and are not intended to limit the scope of the invention.

As used herein, an element or step recited in the singular and preceded with the word "a" or "an" should be understood as not excluding plural said elements or steps, unless such exclusion is explicitly stated. As used in this specification and the appended claims, the term "or" is generally employed in its sense including "and/or" unless the content clearly dictates otherwise.

Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

The invention provides an elongated coupling device to withstand torsional forces in either the clockwise or counterclockwise direction. Generally, the device defines a central region in fluid and/or thermal communication with helical shaped voids circumscribing the central region and extending continuously and unbroken from one end of the coupling to the other end. The central region is coaxial with the longitudinal axis of the coupling. In an embodiment of the invention, the central region is an open passageway adapted to receive fluids (i.e., liquids and gases), particles, radiation, wire, solid shafts and other elongated substrates, lasers, pressurized fluids, negative pressure atmospheres (e.g., vacuums), and combinations thereof.

Figure 2:
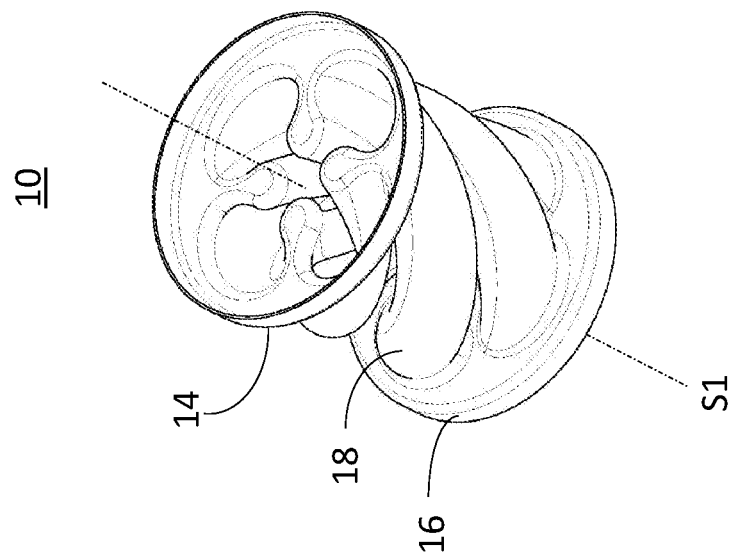
FIG. 2 is an isometric view of the coupling device, in accordance with features of the present invention.
Figure 1:
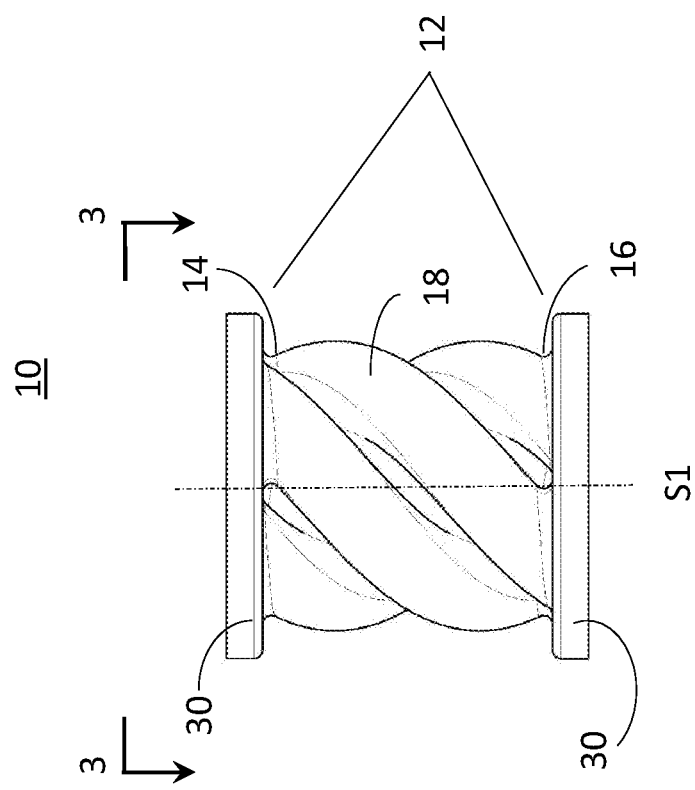
FIG. 1 is an elevational view of a coupling device, in accordance with features of the present invention.

The invention is shown as numeral 10 in FIGS. 1-4. FIG. 1 is an elevational view while FIG. 2 is an isometric view. Generally, the invention comprises an elongated substrate 12 comprising a first end 14, a second end 16 opposite to the first end 12, and four shoulders 18 circumferentially extending from the first end to the second end. The shoulders extend in a helical fashion so as to wrap around the center axis S1 of the substrate 12 and thus are generally parallel with each other. FIGS. 1 and 2 depict three shoulders or lobes 18, a fourth lobe hidden from view. More than one lobe or shoulder 18 is preferred to efficiently provide the reversible helical deformation characteristic of the invention.

Figure 4:
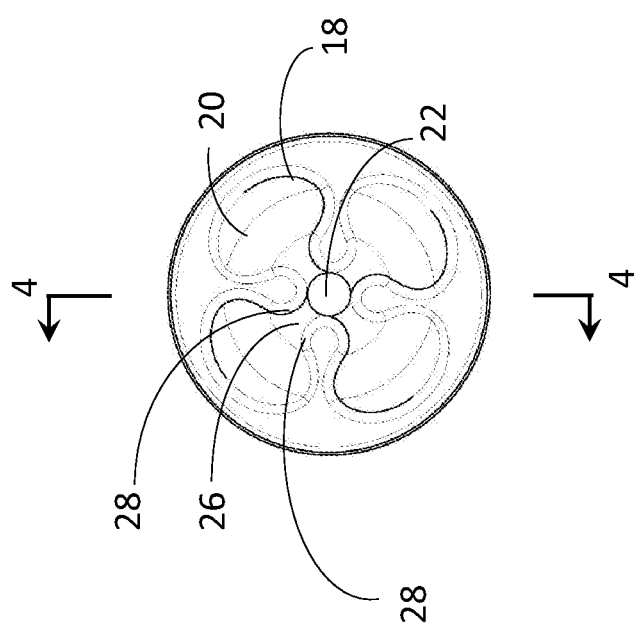
FIG. 4 is a view of the coupling device along line 4-4 of FIG. 3, in accordance with features of the present invention.

As shown in FIGS. 2 and 4, four shoulders 18 are integrally molded with each other so as to form two pairs of diametrically opposed void spaces 20. These void spaces further define a center region 22 which is in fluid communication with each of the four void spaces 20. The void spaces 20 and the center region 22 extend from the first end 14 to the second end 16 of the elongated substrate so as to form a continuous, smooth cavity. Alternatively, the inventors envision the peripherally positioned void spaces 20 to be filled with reversibly deformable material such that the only open space within the elongated structure 10 is the center region 22. In this case, the reversibly deformable material may function as thermal insulation, phase change material, electric insulation, and torsional dampener, among the others.

The cross section of each the void spaces is roughly circular. However, other shapes are also suitable such as ellipses, ovals, bellows shaped, star shaped, and combinations thereof. For example a first pair of diametrically opposed void spaces 20 may be circular, while another pair of diametrically opposed void spaces 20 may be elliptical. This allows the coupling device to be optimized for required applications in terms of rotational resistance, ration of rotation angle and displacement in other directions, and so on.

Figure 3:
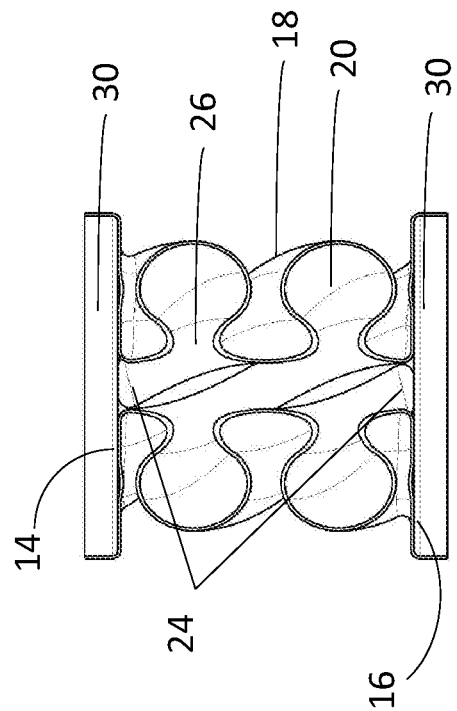
FIG. 3 is a view of the coupling device taken along line 3-3 of FIG. 1, in accordance with features of the present invention.

As shown in FIGS. 3 and 4, the center region 22 of the substrate defines a cylindrically shaped tunnel or passageway 24 extending between the first and second ends 14 and 16. Each void space 20 is in fluid communication with the center passageway 24 via a throat or channel 26 disposed intermediate the void space 20 and center passageway 24, akin to an antechamber or vestibule. This channel 26 may extend the full length of the substrate 12. These vestibules allow for compression along the roll axis of the elongated substrate. Cross section diameter of the vestibules will be a factor in determining extent of twisting. However, if several substrates are fastened end to end, vestibule diameter will become less of a factor. As such, testing will determine the optimum vestibule diameter and length combination. Cross sections of the vestibules may be configured such that the cross sections of the vestibules either constrict or dilate while the center passageway 24 cross section remains unchanged.

As shown in FIG. 3, the opposing channel or walls 28 of the vestibules define concave surfaces or arcs that continuously and seamlessly connect the void space 20 to the center passageway 24. This may reduce the stress concentration and thus improve the durability of the elongated substrate especially in the case of repeated imposition of torsional stress or angular bias in either the clockwise or counterclockwise direction.

The cross section of the center passageway 24 is shown substantially circular. In another embodiment, the section of the passageway 24 can be elliptical, ovoid, non-geometrical (e.g., sine wave form) or other shape. While the figures depict the center passageway 24 coaxial with the substrate 12 and the shoulders 18, the passageway also may be eccentric from the shoulders 18. In this instance while the passageway 24 is coaxial with the longitudinal axis of the elongated substrate 12, the shoulders 18 are not.

The first and second ends of the elongated substrate 12 terminate in radially extending flanges 30. The flanges may be integrally molded with the elongated substrate so that no cold seams or irregularities exist between the structures. Flanges 30 may be used to connect the substrate 12 to opposing ends of a vacuum line, an electrically charged conduit, a fluid line, or other application.

Each of the shoulders 18 may wind around the center region 22 of the elongated substrate to accommodate an angular displacement of between 0 degrees and 360 degrees and typically between 0 and 90 degrees from the first end 14 to the second end 16. The maximum angular displacement is limited only by the length of the elongated substrate. For example, the longitudinally extending peripheral surfaces (e.g., the shoulders 18) of the substrate may be reversibly twisted by up to 360 degrees or even more than 360 degrees while the flanges 30 and central region 22 remain motionless relative to the longitudinally extending surface. The flanges may rotate relative to each other.

Depending on the helical direction, the center passageway 24 may constrict or dilate somewhat when the substrate is twisted in the clockwise or counterclockwise direction. Particularly during constriction at tightening, the center passageway 24 may tighten about a conductor coaxially positioned within the passageway as a physical check to the installer to stop further tightening. Alternatively, the constricting passageway may confer increased pressure to whatever fluid is coursing through the passageway. As such, this characteristic provides an extended uniformly restricting orifice, as a helical iris or aperture.

It should be noted however that the tunnel may define a first cross section in one region of the elongated substrate that is different than a second cross section of the tunnel at another region of the elongated substrate. In this instance, the tunnel has a second cross section contiguous with the first cross section and the second cross section may have a shape different than the first cross section.

As noted supra, more than one shoulder is preferred circumscribing the center region 22. Preferably, at least two shoulders are utilized, most preferably at least three. The total number of shoulders is not limited. Also, the shoulders may be odd numbered, or even numbered. The shoulders may radially extend from the surface of the coupler at an angle from the longitudinal axis of the coupler. That angle may be selected from between 0_degrees and 90 degrees, and preferably between 30 degrees and 60 degrees. An embodiment defined an angle between 40 and 50 degrees.

Generally, all of the shoulders extend radially from the surface at the same angle relative to the longitudinal axis. However, some of the shoulders may radially extend at a different angle compared to other shoulders. Also, any one shoulder may maintain its radially extending angle from one end of the coupling to the other end. Alternatively, any one shoulder may define a varying radially extending angle as the shoulder helically winds from one end to the other. As such any one shoulder may define a cross section at one region of the elongated substrate that is different than its cross section at another region of the elongated substrate.

As can be seen from FIGS. 1 and 2, the shoulders 18 extend clockwise from the first end 14 to the second end 16, when viewed from the first end 14. In another embodiment, the winding direction can be opposite, that is, counterclockwise from the first end to the second end, when viewed from the first end.

Material Detail

The elongated substrate 12 may be 3-D printed. As such, nickel, stainless steel, and aluminum alloy may be used. Metals are preferred if the elongated substrate 12 is intended as a connector in HV, UHV conditions, or as an electrical conduit. In the last instance, the substrate 12 may be coated with an insulator. In instances where a less impermeable material is allowed, the substrate can be made from other materials such as plastics, resin, synthetics, among others. Generally, the substrate may comprise plastic or a metal selected from the group consisting of nickel, stainless steel, copper, aluminum alloy, and combinations thereof.

The wall thickness of the elongated substrate would depend on the constituent material, overall diameter and cross section configuration. For example, the thickness can range between 0.001-0.01 inches. Generally any thickness is suitable which confers upon the substrate enough strength and flexibility to provide hermetic seals in HV or UHV applications, while allowing deformation caused by the twist of the substrate. Typical arc of rotations in these applications range from about 15 degrees to 45 degrees, preferably 15-25 degrees, most preferably 20 degrees. The invented substrate may be rotated past 360 degrees without failure with optimization.

Vacuum System Application Detail

Figure 5:
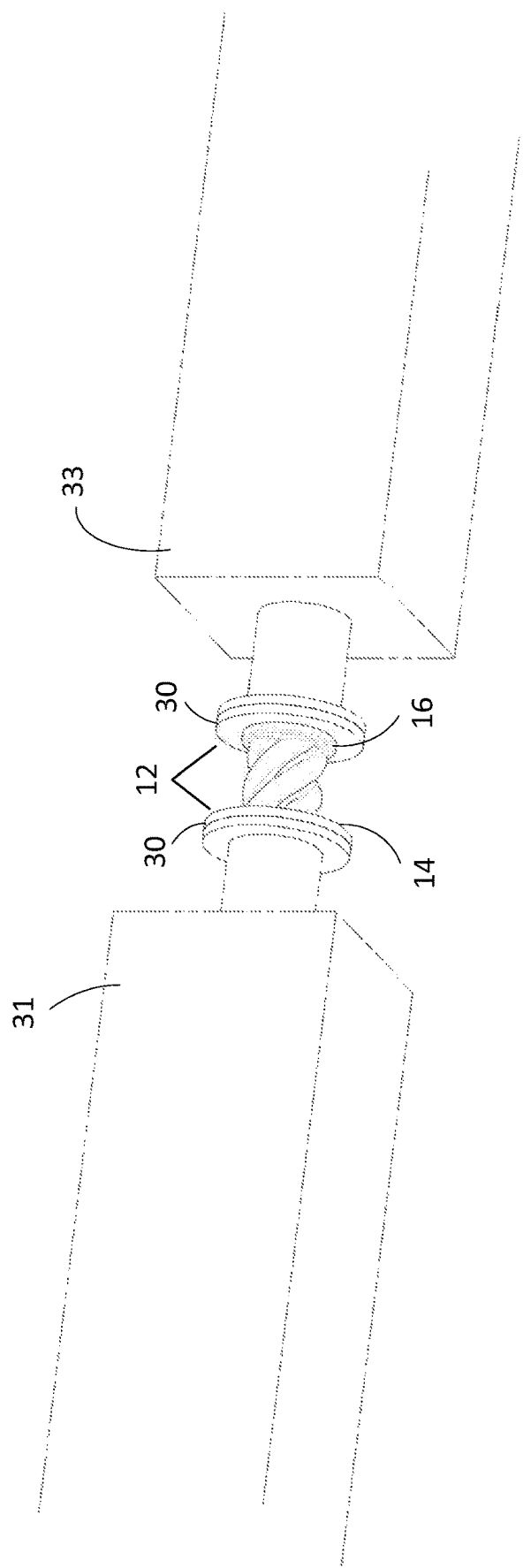
FIG. 5 is an isometric view of a coupler positioned between and attached to opposing ends of a fluid line (e.g., a vacuum line), in accordance with features of the present invention.

In operation in a vacuum system environment as shown in FIG. 5, the first end 14 of the elongated substrate 12 is hermetically sealed to one of the components by fixedly connecting the flange 30 contiguous with that first end 14 to a vacuum line or other component of the vacuum system. Attachment to the component may be via welding, nut and bolt, spring clip, flange, or other arrangement. The other end of the elongated substrate is similarly attached to the port of an opposing component of the vacuum system. The torque may be applied to one or both of the first and second ends 14 and 16 from the components 31 and 33 in the vacuum system through the flanges 30. The regions between the flanges may or may not be contacted directly by a means (such as a wrench) to apply torque to the system.

Since the voids 20 defining the throats 26 are symmetric (e.g., evenly distributed) around the center passageway 24, the now connected elongated substrate 12 may allow for a static twist of misalignment between the two components 31, 33 without the ends of substrate deforming or delaminating from the static equipment ports flanking the substrate. Generally, during attachment and detachment from the vacuum system components, only the peripheral regions (I.e., the shoulders) of the elongated substrate 12, may deform or otherwise twist to accommodate static misalignment between the two components. After the elongated substrate 12 has been mounted. Dynamic yet reversible twisting motion between the first and second ends occurs without a decoupling of the flanges 30 to the vacuum system component.

When the elongated substrate 12 is twisted, the shoulders 18, the throats 26 and the associated voids 20 thereof, will deform accordingly. Since the shoulders 18 are wound around the center region 22, thereby forming a spiral-like structure, they may twist twice as much as necessary to effect hermetic seal (i.e., without effecting the shape of the flanges 30 with which the substrate 18 attaches to the vacuum system componentry). In addition, since the shoulders 18 are wound clockwise when viewing from the first end 14, the length between the first and second ends, and the diameter of the center region 22, will shrink when the first end 14 is twisted clockwise relative to the second end 16, and will expand when the first end 14 is twisted counterclockwise relative to the second end 16.

Figure 6B:
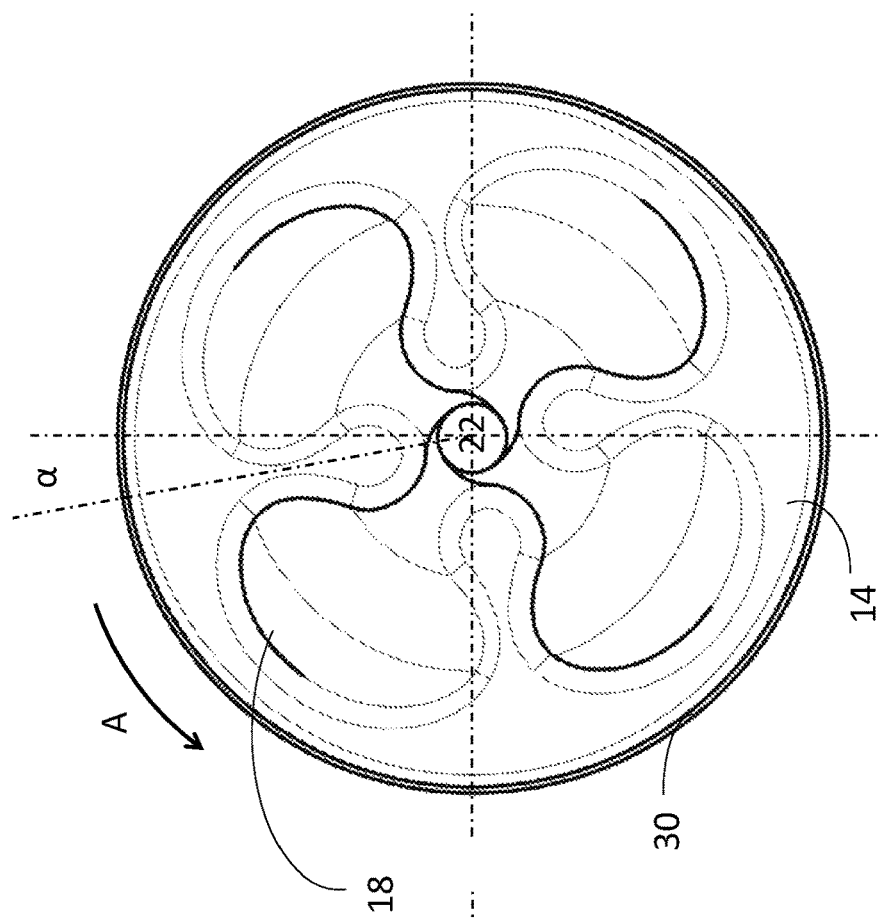
FIG. 6B is a cross-section view of the invented coupler rotated counterclockwise, in accordance with features of the present invention.
Figure 6A:
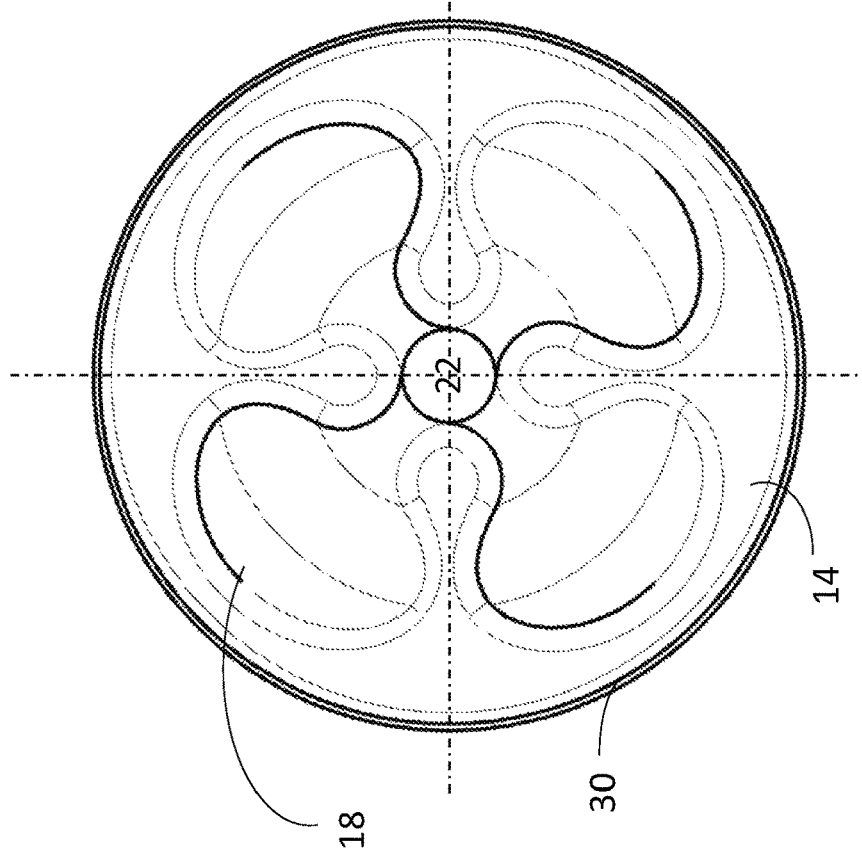
FIG. 6A is a cross-section view of the invented coupler, in accordance with features of the present invention.

FIGS. 6A and 6B depict the change of center region 22 when viewed from the first end 14. FIG. 6A depicts an end view of the coupling device from the first end 14 when the coupling device is relaxed. FIG. 6B depicts a view of the coupling device when the first end 14 is rotated counterclockwise for an angle α=10 degrees relative to the second end 16. As shown in FIG. 6B, the arrow A indicates the direction in which the first end 14 is rotated or twisted relative to the second end (not shown). In this case, since the shoulders 18 are wound around the center region 22 clockwise when viewed from the first end 14 (see FIG. 5), the shoulders 18 come closer to each other so that the center region 22 constricts. In FIG. 6B, the deformation of the shoulders, throats and voids is not obvious, because they are connected to the flange 30, which is rigid and thus deforms much less, at the end 14.

In the embodiments where the shoulders are wound around the center region counterclockwise when viewed from the first end 14, the length between the first and second ends and the diameter of the throat 26 will expand when the first end 14 is twisted clockwise relative to the second end 16, and will shrink when the first end 14 is twisted counterclockwise relative to the second end 16.

Manufacturing Detail

A manufacturing process of the elongated substrate 12 is herein described. It is noteworthy that this substrate may be comprised of a single material such that no seams, or discontinuities exist. The material itself may be homogenous in nature or comprise a homogeneous mixture of different constituents.

Figure 7:
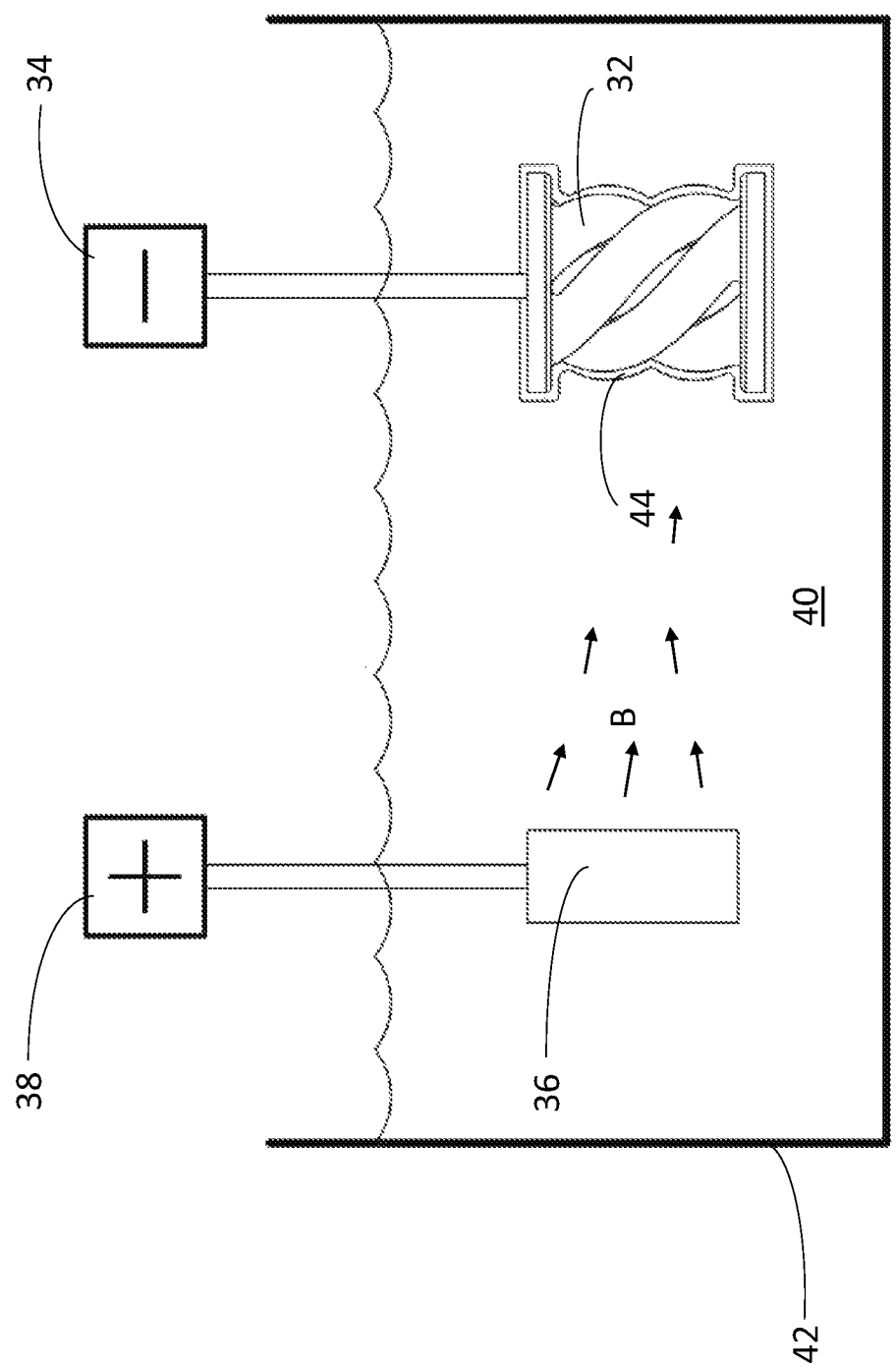
FIG. 7 is a schematic diagram of an electrodeposition process for manufacturing the coupling device, in accordance with features of the present invention.

FIG. 7 shows a schematic view of an exemplary electroplating process for manufacturing the elongated substrate 12 according to the first embodiment. It should be noted that while FIG. 7 depicts an electrodeposition process, other processes are also available to manufacture the features of the elongated substrate, including 3-D printing and hydroforming.

In the process as depicted, a mandrel 32 is provided. The mandrel 32 may be made from aluminum or other material that can be chemically removed after being overlaid with the material finally forming the elongated substrate.

Generally, the mandrel conforms to the interior topography of the final form of the elongated substrate. The mandrel 32 can be formed by machining an aluminum block through computer numerical control, that is, CNC machining. In another embodiment, the mandrel 32 can be formed by 3-D printing, casting, molding, extrusion, machining, laser sintering, or the combination thereof. For example, the mandrel 32 can be formed by molding followed by machining or CNC machining.

The mandrel 32 is then electroplated with nickel or whatever finish metal is to embody the final form of the elongated substrate 12. Typically, the mandrel 32 is electrically connected with a cathode 34 of the electroplating system, while a block 36 of nickel is electrically connected with an anode 38. Both the mandrel 32 and the block 36 are immersed in an electrolytic solution 40, all contained in a container 42. As shown by the arrows B in FIG. 7, when a power supply supplies a direct current to the anode 38, the nickel atoms are oxidized and dissolved in the solution 40, while at the cathode 34, the dissolved nickel ions are reduced. Through the electrodeposition process, a layer of nickel 44 is deposited on the surface of the mandrel 32.

The assembly of the mandrel 32 with the layer 44 is then placed into a leeching tank where the aluminum mandrel 32 is dissolved away leaving just the thin walled layer 44, which substantially conforms to the interior and exterior of the elongated substrate 12.

As noted supra, depending on the metal to be used to form the elongated substrate, the block 36 may comprise another metal, just as long as that metal is less corrosive than the underlying mandrel.

Other Embodiments

Figure 8:
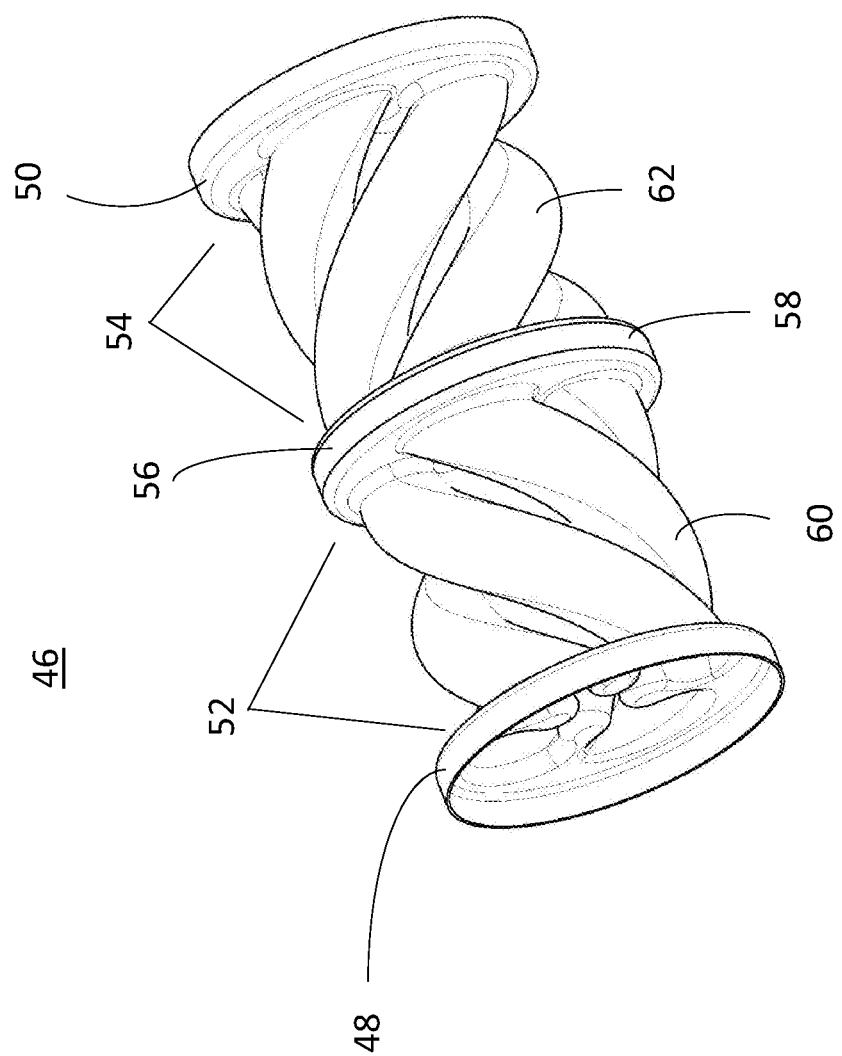
FIG. 8 is an isometric view of two couplers in contact with each other, in accordance with features of the present invention.

FIG. 8 depicts a plurality of separate elongated substrates attached end to end to form an extended elongated substrate 46.

Specifically, the plurality assembly 46 comprises a first end 48 and a second end 50. Between the first and second ends 48 and 50, the assembly 46 comprises a first section 52 and a second section 54. Both sections are similar in construction and features to the single unit described in FIGS. 1-4. The first section 52 and the second section 54 are connected with each other at the mid-point 56 of the extended elongated substrate via a midpoint flange 58 which may be comprised of a downstream flange of the first section 52 and an upstream flange of the second section 54. As such, the center passageway of one section is coaxial with and contiguous with the center passageway of the second section so that the center passageway extends from the first end 48 to the second end 50. The midpoint flange 58 makes it easier to manufacture the extended substrate and ensures the strength at that midpoint flange position 56.

Alternatively, the first section 52 and the second section 54 may be connected with each other through a coupling such as a hollow tubular coupling, a bellows, and so on. When the first section 52 and second section 54 are connected directly with each other, the number and positions of the shoulders of the first section on the section of the connection shall correspond to those of the second section, respectively. It should be noted that when angular force is imposed to the first section 52, its length will change inversely to the length of the second section 54, provided that the two sections are rigidly attached at the midpoint flange position 56. This provides a means for maintaining the length of the extended elongated substrate and is particularly effective when an even number of single modules comprise the extended construct.

The aforementioned means for maintaining the length of the substrate is based on the first section 52 being juxtaposed in reflection symmetry with the second section 54. So, while the shoulders 60 of the first section 52 have the same number, longitudinal length, and spiral pitch as the shoulders 62 of the second section 54, the two sections 52, 54 are positioned such that their respective shoulders effect an opposite winding direction. In the example as shown by FIG. 6, when viewed from the first end, the first shoulders 60 are wound counterclockwise while the second set of shoulders 62 are wound clockwise. It can be understood that, when the first end is twisted relative to the second end, the length of one of the first section 52 and second section 54 will expand while that of the other of the two sections will shrink, so that the overall length of the elongated construct 46 remain substantially unchanged.

Likewise, when the first end 48 is kept fixed in the rotation direction relative to the second end 58, the twist of the midpoint flange 58 will make the two section 52, 54 lengthened or shortened in the same direction. Therefore, the overall length between the first and second ends is lengthened or shortened without relative rotation between the two ends.

Also, if the ends are fixed to opposing components and the center flange is twisted, you could purposely lengthen or shorten it to affect relative component distance while the ends don't rotate relative to one another.

In another embodiment, the first shoulders and the second shoulders may be different in the number of the shoulders, shoulder form, and length, among the others. The first shoulders may be wound in the same direction as the second shoulders. However, it can be understood that as long as the extended elongated substrate comprises two sections with respective shoulders that are wounded in opposite directions, the length change of one section can be offset by that of the other section when the bellows is twisted.

In further other embodiments, the assembly may comprise more than two sections of tubes, and may comprise one or more sections comprising other couplings or bellows.

Figure 9:
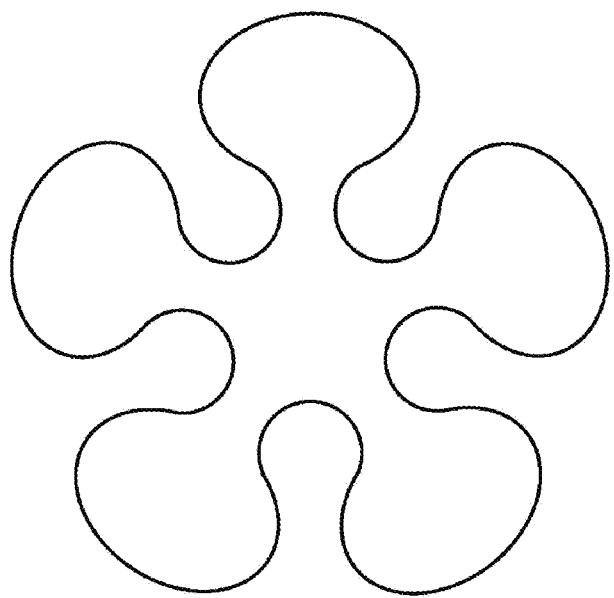
FIG. 9 is a cross sectional view of a five lobed coupling device, in accordance with features of the present invention.

FIG. 9 depicts the cross sections of alternative elongated substrates. This cross section shows that the bellows is provided with five shoulders.

Example

A spiral structure enabled the attachment assembly to allow for a large twist with a relatively short length. In one embodiment, the attachment assembly has a length of 4.75 inches. The attachment assembly may provide a 15 degree twist with a length of no more than 7 inches, or even 3 inches. A plurality of elongated substrates may be attached end to end. In this instance, the degree of angular deformation is the sum of angular deformation of the respective substrates and thus is not limited. Surprisingly and unexpectedly, the overall length of this substrate plurality construct will not change inasmuch as alternate substrates contract or extend longitudinally when an angular force is applied to the flanges defining the first and second end of the multi-substrate construct.

Example

Prototype bellows was created by electroplating an aluminum mandrel with nickel. For the prototype, the aluminum mandrel was created by additive manufacturing (3-D printing) with aluminum laser sintering.

Once the aluminum mandrel is created it was placed into a nickel electroplating tank where nickel was deposited on the surface of the mandrel. The assembly was then placed into a leeching tank where the aluminum mandrel was dissolved away leaving just the thin walled torsionally flexible bellows.

Confirming the inventors' mechanical analysis, this initial prototype was easily able to achieve over 10 degrees of rotation with minimal amounts of torque (<2 lbs-ft). An impromptu rotation done by hand revealed reversible rotation in excess of about 45 degrees.

The ability to flex torsionally was provided by thin helical convolutions that run the length of the bellows at a 45° pitch around the axis. These thin convolutions grew smaller as the bellows were rotated in a counter-clockwise direction, and larger when rotated clockwise, allowing axial compliance.

The cuffs or flanges at each end of the bellows are ultimately be welded to standard vacuum type flanges which are then connected to other vacuum components.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. For example, while the tubes as depicted herein are wound around the center axis of the bellows and are distributed evenly in the circumferential direction of the bellows, the tubes can be wounded around a longitudinal axis that is depart from or oblique to the center axis of the bellows. The tubes can be distributed irregularly along the circumferential direction. Furthermore, the tubes may have different shapes in section from each other. Each tube may have a section that is not consistent along its extending direction.

Furthermore, while the dimensions and types of materials described herein are intended to define the parameters of the invention, they are by no means limiting, but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," "more than" and the like include the number recited and refer to ranges which can be subsequently broken down into subranges as discussed above. In the same manner, all ratios disclosed herein also include all subratios falling within the broader ratio.

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

The invention claimed is:

1. An attachment assembly capable of absorbing torsion, the assembly comprising:
   a) an elongated substrate having a first end and a second end and defining a center longitudinally extending region forming a tunnel which extends between the first end and the second end, wherein the center longitudinally extending region is configured to reversibly constrict or dilate when either the first end or second end is twisted;
   b) a plurality of shoulders wound about the region; and
   c) a void space defined by each of said shoulders further comprising opposing concave surfaces defining radially extending channels intermediate each of said void space and the tunnel, wherein the channels extends the full length of the elongated substrate, said void space in fluid communication with the center longitudinally extending region.

2. The attachment assembly according to claim 1, wherein the channel is formed by opposing wall sections that continuously and seamlessly connect the void space of the shoulder to the tunnel.

3. The attachment assembly according to claim 1 wherein the region is coaxial with the center axis of the elongated substrate.

4. The attachment assembly according to claim 1, wherein the first end terminates in a first flange extending radially and the second end terminates in a second flange extending radially.

5. The attachment assembly according to claim 4 wherein the flanges are integrally molded to the elongated substrate and the flanges rotate relative to each other.

6. The attachment assembly according to claim 1, wherein the tunnel has a first cross section defining a first shape and a second cross section defining a second shape and contiguous with the first cross section.

7. The attachment assembly according to claim 1, wherein the channel defines a minimal cross section which changes directly proportional to the torsion reversibly absorbed by the assembly.

8. The attachment assembly according to claim 1, wherein the void spaces and channels are in fluid communication with the tunnel.

9. The attachment assembly according to claim 1 wherein a wall layer having a thickness between 0.001 and 0.01 inches defines an interior and an exterior of the elongated substrate.

\* \* \* \* \*